US006560695B1

(12) United States Patent
Heaslip (10) Patent No.: US 6,560,695 B1
(45) Date of Patent: *May 6, 2003

(54) DYNAMIC PIPE STAGING ADDER

(75) Inventor: Jay Heaslip, Willifton, VT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/558,406

(22) Filed: Nov. 16, 1995

(51) Int. Cl.[7] ................................................. G06F 9/30
(52) U.S. Cl. ...................................... 712/214; 712/216
(58) Field of Search ................................ 395/800, 390, 395/393, 672, 800.23; 712/216, 23, 214

(56) References Cited

U.S. PATENT DOCUMENTS

| 5,127,093 A | * | 6/1992 | Moore, Jr. ................. 395/393 |
| 5,185,872 A | * | 2/1993 | Arnold et al. .............. 395/393 |
| 5,432,918 A | * | 7/1995 | Stamm ........................ 711/156 |
| 5,524,260 A | * | 6/1996 | Matsuda ...................... 395/392 |
| 5,553,291 A | * | 9/1996 | Tanaka et al. ............... 395/406 |
| 5,555,432 A | * | 9/1996 | Hinton et al. ............... 395/800 |
| 5,621,910 A | * | 4/1997 | Nagamatsu .................. 395/379 |
| 5,634,026 A | * | 5/1997 | Heaslip et al. .............. 395/393 |

* cited by examiner

Primary Examiner—John A. Follansbee
(74) Attorney, Agent, or Firm—Richard M. Kotulak; Bracewell & Patterson, L.L.P.

(57) ABSTRACT

The present invention provides a method and apparatus for processing instructions in which the time allowed for the execution of an instruction is dynamically allocated. The allocation of time for execution of instruction occurs after the instruction is sent to the execution unit. The execution unit determines whether it can complete the instruction during the current processor cycle. In response to an ability to complete the instruction within the current processor cycle, the execution unit issues a busy signal to the reservation station. The reservation station continues to hold the next instruction until the execution until is capable of processing it.

20 Claims, 6 Drawing Sheets

DYNAMIC PIPE STAGING ADDER

BACKGROUND OF THE INVENTION

1. Technical Field

The present invention relates generally to systems for processing information and in particular to an improved method and apparatus for executing instructions. Still more particularly, the present invention relates to an improved method and system for executing instructions requiring different lengths of time for execution.

2. Description of the Related Art

A superscalar microprocessor allows for the out-of-order execution of instructions. In such a microprocessor, a buffer called a "reservation station" is employed to place op codes and operands prior to being sent to an execution unit. In this type of microprocessor instructions are sent to the execution unit when a determination is made that all of the operands are available. Instructions are not required to be executed in program order in such a microprocessor system. Whenever an instruction has all its operands ready, the instruction is selected to be sent for execution by the reservation station. Once the instruction is sent to the execution unit, the reservation station replaces that instruction with the next instruction that is to be sent to the execution unit.

Instructions are sent to an execution unit by asserting a valid signal. The execution unit starts executing the instruction while the reservation station searches for another instruction to send to the execution unit.

In presently available microprocessor systems the execution of instructions in a microprocessor is performed by allocating a selected number of processor cycles for an execution unit to execute a given instruction, whether or not that instruction requires the setting of condition codes. As a result, an instruction that does not require the setting of a condition code has more time allocated for its execution then is necessary. Consequently, excess processor cycles are present to execute many instructions. It would be advantageous to have a method and apparatus for adjusting the amount of time set aside for execution of instructions based on the amount of time required by a particular instruction.

SUMMARY OF THE INVENTION

It is therefore one object of the present invention to provide an improved system for processing information.

It is another object of the present invention to provide a method and system for executing instructions.

It is yet another object of the present invention to provide a method and system for executing instructions requiring different lengths of time for execution.

The present invention provides a method and apparatus for processing instructions in which the time allowed for the execution of an instruction is dynamically allocated. The allocation of time for execution of instruction occurs after the instruction is sent to the execution unit. The execution unit determines whether it can complete the instruction during the current processor cycle. In response to an inability to complete the instruction within the current processor cycle, the execution unit issues a busy signal to the reservation station. The reservation station continues to hold the next instruction until the execution unit is capable of processing it.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF PREFERRED EMBODIMENT

System Description

Figure 1:
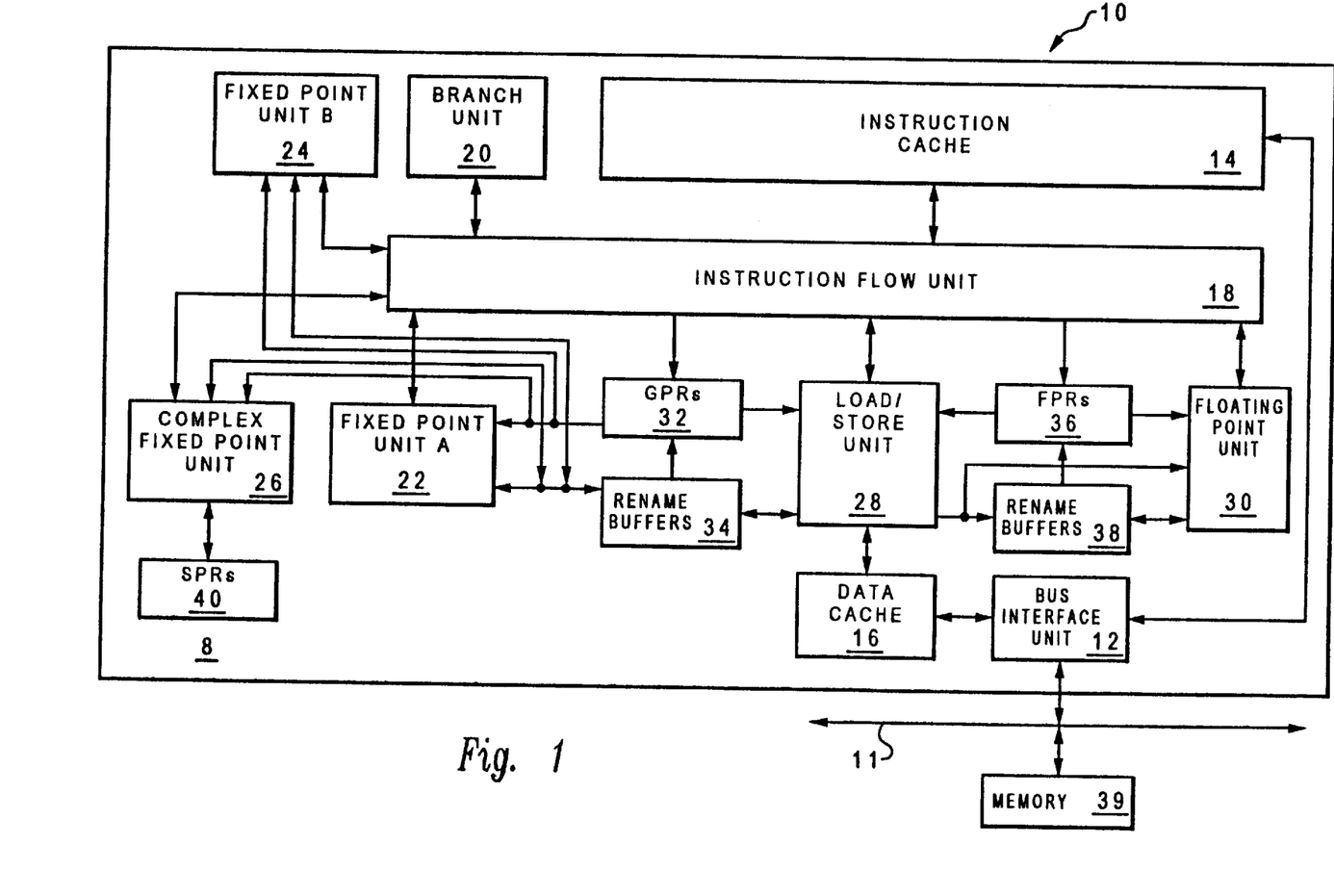
FIG. 1 is a block diagram of a processing system in accordance with a preferred embodiment of the present invention.
Figure 2:
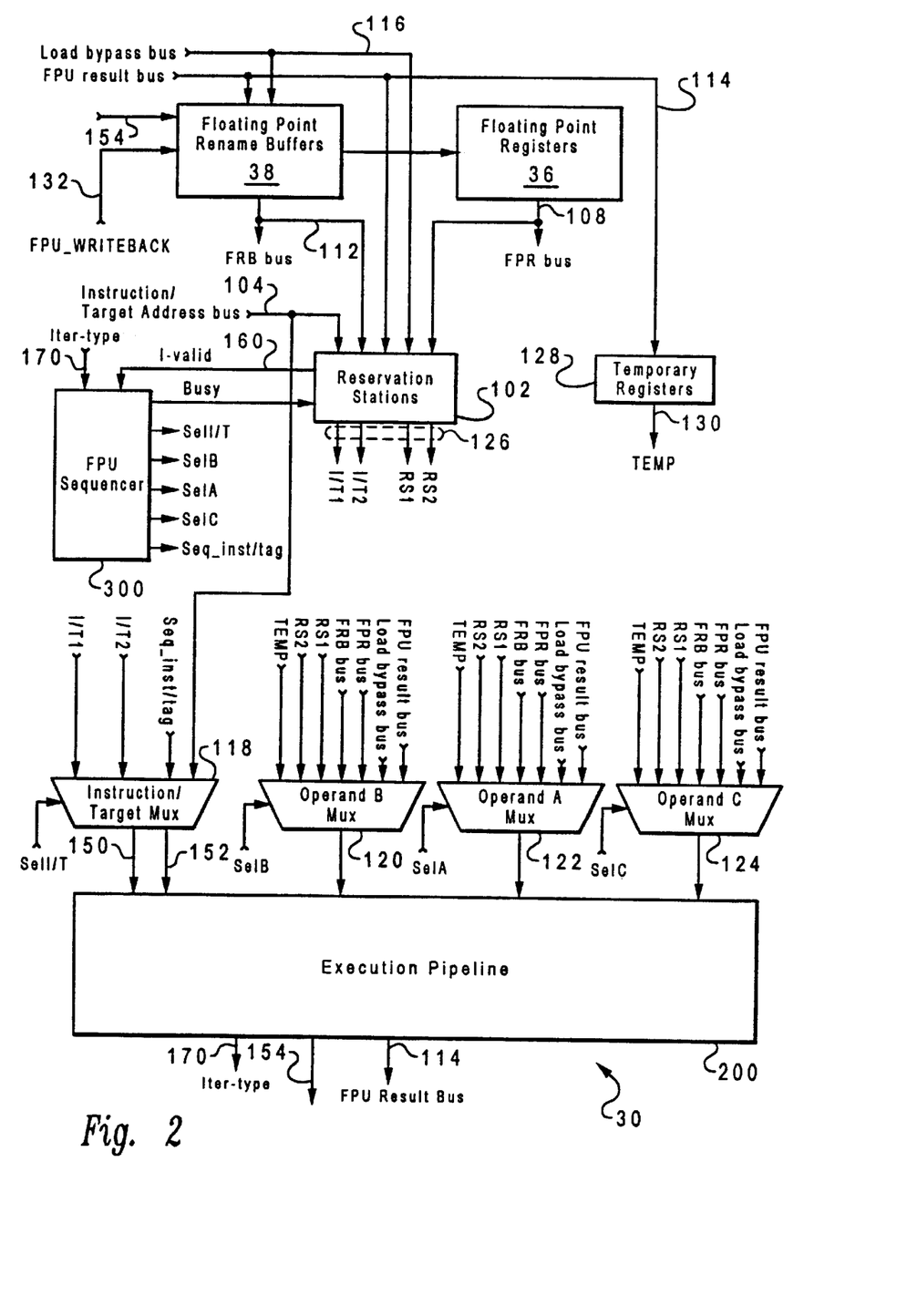
FIG. 2 is a block diagram of a pipeline FPU in accordance with a preferred embodiment of the present invention.

In FIG. 1 and FIG. 2, all information paths are shown with a single line and each such data path transfers multiple bits of information. Likewise, unless otherwise specified, all control signals, registers, multiplexers, and other sections of system 10 operate in response to multiplexed bits of information.

With reference to FIG. 1, a block diagram of a system, indicated generally at 10, for processing information is illustrated according to the present invention. A processor 8 of system 10 is a single integrated circuit superscalar microprocessor. Accordingly, as discussed further hereinbelow, system 10 includes various units, registers, buffers, memories, and other sections, all of which are formed by integrated circuitry. Also, in the preferred embodiment, system 10 operates according to reduced instruction set computing ("RISC") techniques. As shown in FIG. 1, a system bus 11 is connected to a bus interface unit ("BIU") 12 of system 10. BIU 12 controls the transfer of information between processor 8 and system bus 11.

BIU 12 is connected to an instruction cache 14 and to a data cache 16 of system 10. Instruction cache 14 outputs instructions to an instruction flow unit 18. In response to such instructions from instruction cache 14, instruction flow unit 18 selectively outputs instructions to other execution circuitry of system 10.

In addition to instruction flow unit 18, in the preferred embodiment the execution circuitry of system 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers "FXRBs") 34. FXUA 22, FXUB 24, CFXU 26 and LSU 28 output results (destination operand information) of their operations for storage at selected entries in fixed point rename buffers 34.

Also, CFXU 26 inputs and outputs source operand information and destination operand information to and from special purpose registers ("SPRs") 40. Moreover, LSU 28 inputs source operand information from floating point architectural registers ("FPRs") 36.

FPU 30 inputs its source operand information from FPRs 36, floating point rename buffers ("FPRBs") 38, and LSU 28. LSU 28 and FPU 30 output results (destination operand information) of their operations for storage at selected entries in floating point rename buffers 38.

In response to a Load instruction, LSU 28 inputs information from data cache 16 and copies such information to selected ones of rename buffers 34 and 38 and FPU 30. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Instruction flow unit 18 outputs information to GPRs 32 and FPRs 36. From instruction flow unit 18, branch unit 20 inputs instructions and signals indicating a present state of system 10. In response to such instructions and signals, branch unit 20 outputs (to instruction flow unit 18) signals indicating suitable memory addresses storing a sequence of instructions for execution by system 10. In response to such signals from branch unit 20, instruction flow unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, instruction flow unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating multiplication and division operations.

As information is stored at a selected one of rename buffers 34, such information is associated with a storage location (e.g. one of GPRs 32) as specified by the instruction for which the selected rename buffer is allocated. Information stored at a selected one of rename buffers 34 is copied to its associated one of GPRs 32 in response to signals from instruction flow unit 18. Instruction flow unit 18 directs such copying of information stored at a selected one of rename buffers 34 in response to "completing" the instruction that generated the information. Such copying is called "writeback". System 10 includes multiple "writeback" paths between rename buffers 34 and GPRs 32, for transferring information from multiple ones of rename buffers 34 to GPRs 32 during a single cycle of system 10.

As information is stored at a selected one of rename buffers 38, such information is associated with one of FPRs 36. Information stored at a selected one of rename buffers 38 is copied to its associated one of FPRs 36 in response to signals from instruction flow units 18. Instruction flow unit 18 directs such copying of information stored at a selected one of rename buffers 38 in response to "completing" the instruction that generated the information. System 10 includes multiple "writeback" paths between rename buffers 38 and FPRs 36, for transferring information from multiple ones of rename buffers 38 to FPRs 36 during a single cycle of system 10.

System 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, completion, and writeback.

In the fetch stage, instruction flow unit 18 selectively inputs (from instruction cache 14) one or more instructions from one or more memory addresses storing the sequence of instructions discussed further hereinabove in connection with branch unit 20 and instruction flow unit 18.

In the decode stage, instruction flow unit 18 decodes up to four fetched instructions.

In the dispatch stage, instruction flow unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information). In the dispatch stage, operand information is supplied to the selected execution units for dispatched instructions. System 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, system 10 is able to execute instructions out-of-order relative to their programmed sequence.

In the completion stage, instruction flow unit 18 indicates an instruction is "complete".

In the writeback stage, instruction flow unit 18 directs the copying of information from rename buffers 34 and 38 to GPRs 32 and FPRs 36, respectively. Likewise, in the writeback stage of a particular instruction, system 10 updates its architectural states in response to the particular instruction.

During each machine cycle of processor 8, processor 8 normally finishes a stage of instruction processing for each instruction being processed. Nevertheless, some instructions (such as an iterative instruction executed by FPU 30) may take more than one machine cycle to finish the execute stage of instruction processing. Examples of iterative instructions are a divide instruction and a square-root instruction. Accordingly, a variable delay may occur between a particular instruction's execution and completion stages in response to the variation in time required for processing of preceding instructions.

FIG. 2 is a block diagram of pipeline FPU 30 according to the present invention. FPU 30 includes two reservation stations 102, although more than two can be included in alternative embodiments. In normal operation, each of reservation stations 102 inputs and stores an instruction and its associated rename buffer target addresses (i.e. the addresses of the instruction's assigned buffers in FPRBs 38) and register file target addresses (i.e. the addresses of the instructions' specified registers in FPRs 36) from instruction flow unit 18 (FIG. 1) through an instruction/target address bus 104. Moreover, reservation stations 102 input and store operands (associated with the instructions stored in reservation stations 102) from any of four operand suppliers, namely:

1. FPRs 36 (through an FPR bus 108);
2. FPRBs 38 (through an FRB bus 112);
3. a three-stage execution pipeline 200 (through an FPU result bus 114); and
4. load/store unit 28 (through a load bypass bus 116).

While instruction flow unit 18 dispatches an instruction, if one or more of the instruction's operands (written by processor 8 into one of reservation stations 102) is not validly available from one of the four operand suppliers, then the instruction has an unresolved dependency on another instruction's result. If an instruction has such an unresolved dependency, processor 8 resolves the dependency after each unavailable operand later becomes validly available from either the load bypass bus 116 or FPU result bus 114.

At a suitable moment when pipeline 200 is available to process an instruction, FPU sequencer 300 circuitry selects one of reservation stations 102. In response to being selected by processor 8, the selected reservation station outputs ("launches") its stored instruction and associated rename buffer target address and register file target address into execution pipeline 200 through instruction/target multiplexer 118. In connection with launching (i.e. initiating processing/execution on an instruction, the selected reservation station launches the instruction's associated operand (s) into execution pipeline 200 through the operand multiplexers, namely operand B multiplexer 120, operand A multiplexer 122, and operand C multiplexer 124.

Multiplexers 118, 120, 122 and 124 operate in response to signals on Sell/T, SelB, SelA, and SelC lines, respectively, from sequencer 300. Sequencer 300 selectively outputs signals on Sell/T, SelB, SelA and SelC lines in response to signals received by sequencer 300 from reservation stations 102 through I-valid lines 160. Reservation stations 102 output signals on I-valid lines 160 in response to valid instruction being (a) stored in reservation stations 102 and (b) available for launching to pipeline 200. Sequencer 300 further outputs signals on Sell/T, SelB, SelA, and SelC lines in response to iteration-type information received by sequencer 300 from pipeline 200 through an Iter-type bus 170. According to the present invention Sequencer 300 also outputs a busy signal on a busy line that is connected to reservation stations 102. This busy signal is used in pipestage adding according to the present invention. Sequencer 300 and Iter-type bus 170 are discussed further hereinbelow in connection with FIG. 2.

Pipeline 200 is the only execution path in FPU 30. Accordingly, each instruction processed by FPU 30 is processed only through pipeline 200 in order to generate and output a result on FPU result bus 114 in response to the instruction. In response to successfully launching an instruction from a reservation station, the reservation station is available to input and store another instruction and its operands. By comparison, if an instruction is not successfully launched from a reservation station during a particular cycle of processor 8, then the reservation station continues to store (1) the instruction, (2) the instruction's associated rename buffer target address, (3) the instruction's associated register file target address, and (4) the instruction's associated operand(s), until a later cycle of processor 8.

An instruction is considered to have launched successfully if all of its necessary operands are valid in the first stage of execution pipeline 200. These operands need not have been stored in the reservations station at the time of launch. This is because multiplexers 120, 122 and 124 are able to multiplex operands from a reservation stations bus 126, and also from FPR bus 108, FRB bus 112, FPU result bus 114, load bypass bus 116, and any of six temporary registers 128.

Reservation station bus 126 includes an I/T1 bus for outputting (from the first one of reservation stations 102 to pipeline 200): the reservation station's stored instruction; the instruction's associated rename buffer target address; and the instruction's associationed register file target address. Also, reservation station bus 126 includes an RS1 bus for outputting (from the first one of reservation stations 102 to pipeline 200) the instruction's associated operand A, operand B and operand C. Likewise, reservation station bus 126 includes an I/T2 bus for outputting (from the second one of reservation stations 102 to pipeline 200): the reservation station's stored instruction; the instruction's associated rename buffer target address; and the instruction's associated register file target address. Also, reservation station bus 126 includes an RS2 bus for outputting (from the second one of reservation stations 102 to pipeline 200) the instruction's associated operand A, operand B and operand C.

Accordingly, the I/T1 and I/T2 buses (of reservation station bus 126) are multiplexed through multiplexer 118 to pipeline 200, so that multiplexer 118 outputs information to pipeline 200 through buses 150 and 152 from either the I/T1, I/T2, or Seq_inst/tag buses. More particularly, multiplexer 118 outputs instruction information to pipeline 200 through bus 150; also, multiplexer 118 outputs target address information (e.g. information indicating target addresses in one or more of FPRs 36, FPRBs 38 and temporary registers 128) to pipeline 200 through bus 152. Multiplexer 118 outputs such information in response to a signal on Sell/T lines from sequencer 300. The Seq_inst/tag bus is discussed further hereinbelow in connection with sequencer 300. Likewise, the RS1 and RS2 buses (of reservation station bus 126) are multiplexed through multiplexers 120, 122, and 124 to pipeline 200 in response to signals on SelB, SelA and SelC lines from sequencer 300.

FPU 30 includes temporary registers 128 for storing intermediate results generated during an iterative instruction execution by FPU 30. Accordingly, temporary registers 128 input information from pipeline 200 through FPU result bus 114. Temporary registers 128 output information to pipeline 200 through TEMP bus 130 connected to each of multiplexers 120, 122 and 124.

FPU 30 processes a successfully launched instruction through each stage of pipeline 200. After the instruction is processed through the last stage of pipeline 200, pipeline 200 outputs a result of the instruction of FPU result buss 11. FPU 30 stores the result from FPU result bus 114. FPU 30 stores the result from FPU result bus 114 into one of FPRBs 38 selected in response to the instruction's associated rename buffer target address (output to FPRBs 38 from pipeline 200 through a bus 154). At a suitable moment, instruction flow unit 18 (FIG. 1) outputs a signal through an FPU_WRITEBACK line 132 to FPRBs 38. In response to this signal, information is output from one or more of FPRBs 38 to FPRs 36. The output information is then stored in one or more of FPRs 36 selected in response to the instruction's associated register file target address (output to FPRBs 38 from pipeline 200 through bus 154).

FPU 30 processes information in response to several different types of instructions, including the following illustrative types of instructions:

floating point divide ("fdiv") a/b;
floating point negate multiply subtract ("fnmsub") −(a*c−b);
floating point add ("fadd") a+b;
floating point multiply ("fmul") a*c;

floating point multiply add ("fmadd") a*c+b;
floating point move register ("fmr") b->Fx;
where a=operand A, b=operand B, c=operand C, "/" denotes a divide operation, "*" denotes a multiply operation, "+" denotes an addition operation, "−" denotes either negation or a subtraction operation, "->" denotes a move operation, and "Fx" denotes the xth register of FPRs 36. In the preferred embodiment, pipeline 200 operates according to the IEEE standard for binary floating point arithmetic STD 754-1985 and includes a fused multiply-add array for performing the arithmetic operation b+a*c.

FPU 30 is able to finish processing any of the fnmsub, fadd, fmul, fmadd, and fmr types of instructions during a single pass through pipeline 200. FPU 30 finishes processing an instruction (which has been dispatched form instruction flow unit 18) when FPU 30 stores the instruction's result from FPU result bus 114 into a selected one of FPRBs 38.

Further, FPU 30 processes information in response to a square-root ("sqrt") type of instruction. The fdiv and sqrt instructions are classified as iterative instructions because FPU 30 finishes processing such an instruction during multiple iterative passes through pipeline 200. In this manner, the hardware circuitry of FPU 30 is streamlined, because dedicated circuitry is not used to execute an iterative instruction (such as the fdiv and sqrt instructions).

In order to control execution of an iterative instruction by FPU 30, sequencer 300 selectively outputs a sequence of instructions and target addresses to pipeline 200 through the Seq_inst/tag bus and multiplexer 118. These target addresses from sequencer 300 include target addresses of assigned ones of temporary registers 128 for storing intermediate results generated during an iterative instruction execution by pipeline 200.

Accordingly, in response to an instruction input from multiplexer 118, pipeline 200 decodes the instruction and outputs information to sequencer 300 through Iter-type bus 170. The information from Iter-type bus 170 indicates to sequencer 300 whether the instruction is an iterative instruction and, if so, the type (e.g. fdiv or sqrt) of iterative instruction. In response to the information from Iter-type bus 170, sequencer 300 selectively outputs a sequence of instructions and target addresses to pipeline 200 through the Seq_inst/tag bus and multiplexer 118, in order to control execution of the iterative instruction by FPU 30. Sequencer 300 further outputs signals on SelB, SelA and SelC lines in order to control multiplexers 120, 122, and 124, respectively, so that suitable operands are outputted to pipeline 200 during execution of the iterative instruction.

During execution of the iterative instruction, FPU 30 convergently generates a result by executing the sequence of instructions from sequencer 300. FPU 30 executes the sequence of instructions from sequencer 300 by processing the sequence of instructions through pipeline 200. Some of these instructions are data dependent on results of earlier instructions in the sequence.

Dynamic Pipestage

The present invention provides a method and apparatus in which the time allowed for the execution of an instruction is not allocated a priori. Instead, the time needed for execution of an instruction is dynamically determined after the instruction is sent to an execution unit. In such an approach, the execution unit determines whether it can complete the instruction during the current processor cycle. If the execution unit cannot complete processing of the instruction, the execution unit through sequencer 300 issues a busy signal to the reservation station 102. In response, the reservation station acts on this signal by holding the next instruction until the execution unit is ready to accept the next instruction.

Such a process is a dynamic addition of a cycle, also called "pipestage adding". This dynamic addition of one or more cycles allows for the time that is required to execute a particular instruction. In the instance that the instruction does not require the setting of condition codes and can be competed during the current processor cycle, no "busy signal" is sent to the reservation station 102. In this situation, the reservation station sends the next instruction on the completion of the current cycle, resulting in no pipestage being added. This results in no waste of time during the execution of instructions.

Figure 3:
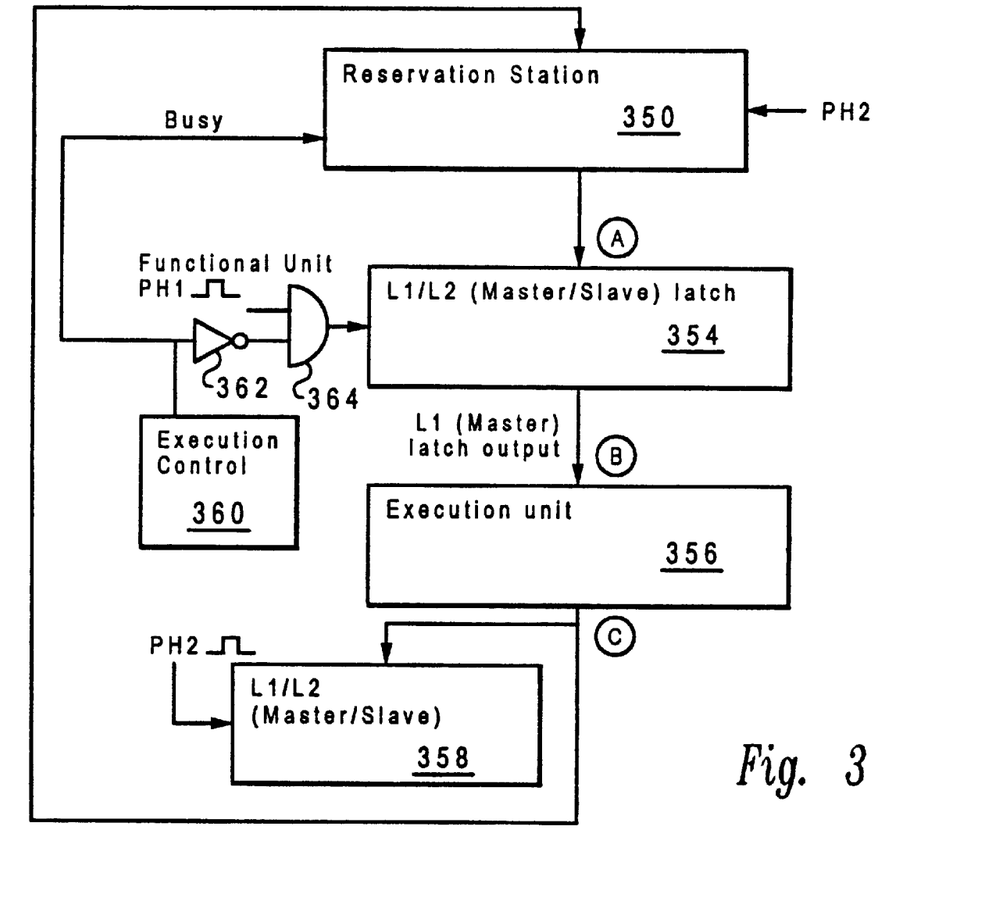
FIG. 3 is a block diagram of reservation station and a functional unit in accordance with a preferred embodiment of the present invention.

Turning to FIG. 3, a block diagram of components for dynamically adding pipestages is depicted according to the present invention. Reservation station 350 has an output connected to latch 354. Reservation station 350 includes buffers for storing instructions that are to be issued to execution units via latch 354. In particular, reservation station 350 sends instructions to latch 354. Latch 354 has an output connected to execution unit 356. The output of execution unit 356 may be directed back to reservation station 350. A cache 358 is connected to execution unit 356. Execution control 360 in conjunction with inverter 362, and AND gate 364 control latch 354. In particular, latch 354, execution unit 356, and cache 358 correspond to execution pipeline 200 in FIG. 2. Execution control 360 corresponds to FPU sequencer 300 in FIG. 2. Inverter 362 and AND gate 364 are not shown in FIG. 2. These particular components are employed to control latch 354 to prevent the sending of the instructions to execution unit 356 when a busy signal is asserted by execution control 360.

Figure 4:
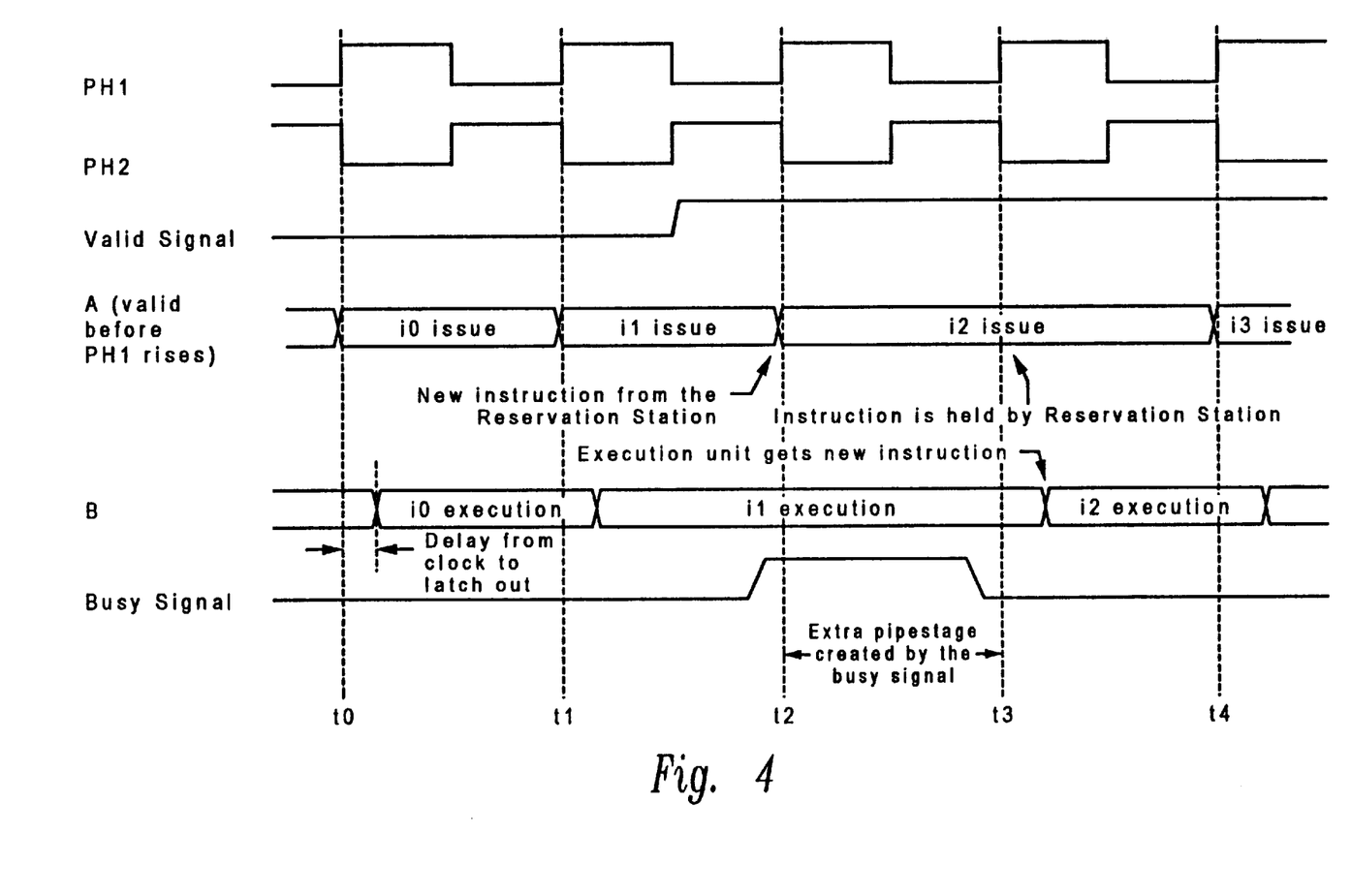
FIG. 4 is a timing diagram illustrating the adding of pipestages in accordance with a preferred embodiment of the present invention.

Instructions are sent to functional unit 352 by asserting a valid signal. In response to a valid signal, an instruction is sent from the reservation station 350 to the latch 354 on the falling edge of clock signal PH2. Execution of an instruction follows after the latch 354 sends the instruction on to execution unit 356 in response to the rising edge of clock signal PH1. These clock signals are depicted in FIG. 4. Execution control 360 may conditionally determine that additional processor cycles are required to execute a given instruction sent to execution unit 356 from reservation station 350. Such a determination is made by decoding the op code of the instruction to be executed.

For example, a SHIFT instruction that sets condition codes will have a different op code than a SHIFT that is not intended to set condition codes. Execution unit 356 will decode the op code to determine what type of instruction is to be performed. As a result of this decode, execution control 360 will send a "busy" signal back to reservation station 350 for instructions that require extra processor cycles to execute. In such a situation, execution unit 356 will not receive another instruction from reservation station 350 until it has finished processing the current instruction. In particular, when a busy signal is asserted, the latch will not be set to send instructions to execution unit 350. When a busy signal is not asserted, the latch will be set to send an instruction to execution unit 360.

Reservation station 350 responds to a busy signal from execution unit 356 by continuing to send the instruction that it has selected for execution of that processor cycle. This response by reservation station 350 allows execution unit 356 to complete processing of the instruction that it is currently working on. In effect, more time is provided for execution unit 356 to complete processing of the instruction.

According to the present invention, reservation station 350 also contains two bits to record the state of each of the instruction in a buffer. The first of these two bits is a valid bit. The valid bit is employed to determine whether an entry in the buffer contains a valid instruction. Reservation station 350 will not attempt to send an instruction to execution unit 356 unless it is valid. Sending the instruction for execution is also called "issuing" an instruction. The second bit is the "issued bit". The issued bit is set whenever an instruction has been sent and has been accepted by an execution unit. If execution unit 356 sends a busy signal back to reservation station 350, then the issued bit of an instruction is not set. As a result, reservation station 350 will continue to attempt to send the instruction to execution unit 356 in the next processor cycle. Such attempts will continue until reservation station 350 obtains an indication from execution unit 356 that the instruction has been accepted. The indication is made by not asserting a busy signal. At this time, the issued bit will be set for the instruction.

With reference now to FIG. 4, a timing diagram illustrating how additional pipestages may be added for instructions requiring additional processor cycles. At time t0, instruction i0 is issued from reservation 350. In issuing an instruction, the instruction is sent from reservation station 350 to latch 354. Execution of instruction i0 occurs a period of time after time t0. This period of time is the delay from the clock to latch out from latch 354. As can be seen, the execution of instruction i0 requires only a single processor cycle. At time t1, an instruction i1 is issued from reservation station 350 to latch 354. The execution of instruction i1 continues into time t2. As can be seen, execution unit 356 issues a busy signal that prevents the issued bit in the reservation station from being set for instruction i2. Instruction i2 continues to be issued until the busy signal is no longer being asserted. At time t3 plus the delay from latch 354, the execution of instruction i2 begins.

Figure 5:
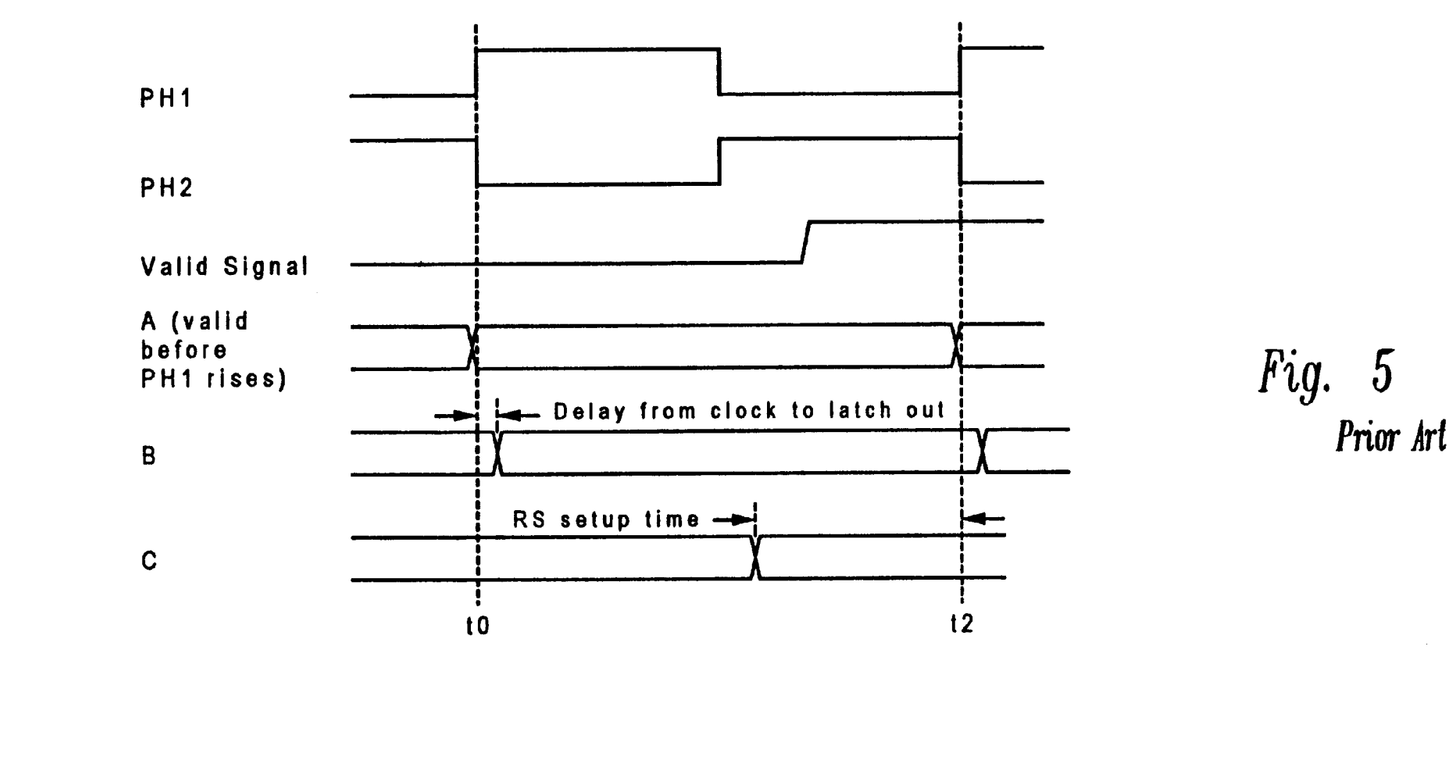
FIG. 5 is a timing diagram of a process for issuing instructions known in the prior art.

Turning now to FIG. 5, a timing diagram of a process known in the art is depicted. As can be seen, in such a situation execution of an instruction requiring a time from t0 to t2 is performed by having processor cycles that are twice as long as those depicted in the timing diagram of FIG. 4.

Figure 6:
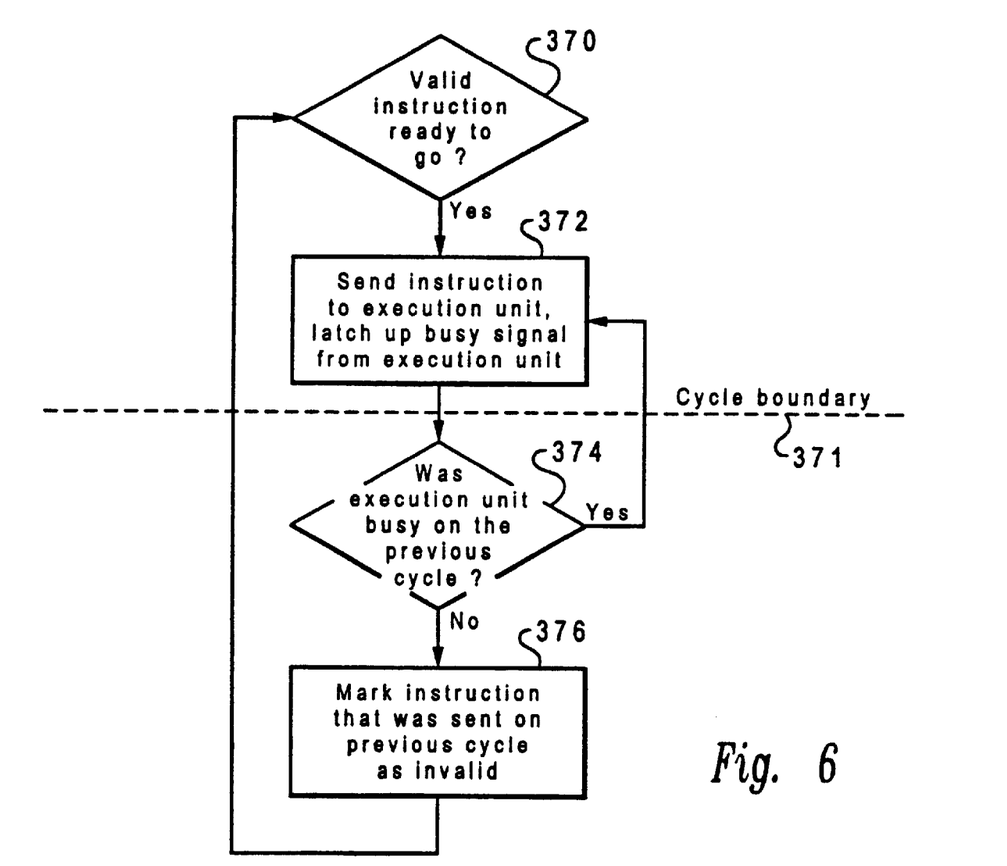
FIG. 6 is a flowchart of a process for pipestage adding in accordance with a preferred embodiment of the present invention.

With reference now to FIG. 6, a flowchart of a process for pipestage adding is depicted in accordance with a preferred embodiment of the present invention. The process determines whether a valid instruction is present (step 370). The process waits at step 370 until a valid instruction is present. In response to a valid instruction being present in the reservation station, the process then sends the instruction to the execution unit and latches up the busy signal from the execution unit to determine whether a busy signal has been asserted by the execution unit.

The process then enters the next processor cycle as indicated by cycle boundary line 371 in FIG. 6. This processor cycle, determines whether the execution unit was busy on the previous processor cycle (step 374). If the execution unit was not busy on the previous processor cycle, the instruction. Sent on the previous instruction cycle is marked invalid (step 376). The instruction is marked as sent by changing the issued bit. Afterwards, the process returns to (step 370). With reference again to step 374, if the execution unit was busy on the previous processor cycle, the process then returns to step 372 to determine whether the execution unit is still asserting a busy signal.

In accordance with the present invention, the use of a valid signal and a busy signal employed in the manner described above allows the dynamic addition of pipestages to allow a processor system to run at higher clockrates. The amount of increase in the clockrate depends on how many instructions can be executed by the faster clockrate verses how many instructions may require one or more additional pipestages to be processed. The present invention is especially desirable in situations in which the clockrate may be doubled.

While the invention has been particularly shown and described with reference to a preferred embodiment, it will be understood by those skilled in the art that various changes in form and detail may be made therein without departing from the spirit and scope of the invention.

What is claimed is:

1. A processing system comprising:

an execution unit, wherein the execution unit generates a busy signal when the execution unit is unable to complete processing an instruction within a single processing cycle; and a reservation station connected to the execution unit, the reservation station having buffers for storing instructions, the reservation station including:
issuing means for sending the instruction to the execution unit from the reservation station during an initial processing cycle;
determination means for determining in a subsequent processing cycle whether the execution unit was busy during the initial processing cycle by checking a state of an issued bit associated with the instruction; and
reissuing means for resending the instruction to the execution unit during the subsequent processing cycle.

2. The processing system of claim 1, further comprising a determination means for determining whether an instruction in the reservation station is valid and wherein the issuing means sends the instruction to the execution unit from the reservation station in response to a determination that the instruction is valid.

3. The processing system of claim 1, further comprising marking means for marking the instruction as processed in response to an absence of a determination that the execution unit was busy during the initial processing cycle.

4. A method of operating a processing system, the method comprising:

sending a first instruction to an execution unit for processing during a first processing cycle;

determining whether the execution unit can complete processing of the first instruction during the first processing cycle; and sending a second instruction to the execution unit for processing during a second processing cycle following the first processing cycle;

setting an issued bit associated with the second instruction in response to not detecting a busy signal from the execution unit; and leaving the issued bit unset in response to detecting a busy signal from the execution unit.

5. The method of claim 4, further comprising:

during a third processing cycle following the second processing cycle, determining whether the issued bit associated with the second instruction is set; and responsive to determining that the issued bit associated with the second instruction is not set, sending the second instruction to the execution unit for processing during the third processing cycle.

6. The method of claim 5, further comprising:

determining whether a busy signal is being transmitted by the execution unit; and setting the issued bit in response to determining that the execution unit is able to complete processing of the first instruction during the second processing cycle.

7. The method of claim 5, further comprising:

setting an issued bit associated with the first instruction upon completion of execution of the first instruction by the execution unit.

8. The method of claim 5, further comprising:

setting an issued bit associated with the second instruction upon completion of execution of the second instruction by the execution unit.

9. The method of claim 4, wherein the step of sending a second instruction to the execution unit further comprises:

determining whether an issued bit associated with the second instruction is set.

10. The method of claim 4, wherein the step of determining whether the execution unit can complete processing of the first instruction during the first processing cycle further comprises:

during the second processing cycle, determining whether a busy signal from the execution unit was asserted during the first processing cycle.

11. The method of claim 10, wherein the step of setting an issued bit associated with the second instruction in response to a determination that the execution unit is able to complete processing of the first instruction during the first processing cycle further comprises:

setting the issued bit in response to determining that the busy signal was not asserted during the first processing cycle.

12. The method of claim 10, wherein the step of not setting the issued bit in response to a determination that the execution unit is unable to complete processing of the first instruction during the first processing cycle further comprises:

not setting the issued bit in response to determining that the busy signal was asserted during the first processing cycle.

13. A method of operating a processing system including a reservation station and an execution unit, the method comprising:

sending an instruction to the execution unit from the reservation station during a first processing cycle;

during a second processing cycle, determining whether the execution unit was busy during the first processing cycle by checking a state of an issued bit associated with the instruction; and responsive to a determination that the execution unit was busy during the first processing cycle, resending the instruction to the execution unit from the reservation station during the second processing cycle.

14. The method claim 13, further comprising determining whether an instruction is valid; and wherein the step of sending comprises sending the instruction to the execution unit in response to a determination that the instruction is valid.

15. The method of claim 13, further comprising marking the instruction as invalid in response to an absence of a determination that the execution unit was busy.

16. The method of claim 15, wherein the step of determining the execution unit was busy comprises determining whether a busy signal has been issued by the execution unit.

17. A processing system comprising:

an execution unit, wherein the execution unit generates a busy signal when the execution unit is unable to complete processing an instruction within a single processing cycle; and a reservation station connected to the execution unit, the reservation station having buffers for storing instructions, and the reservation station including:

a determination means for determining whether an instruction in the reservation station is valid;

issuing means for sending the instruction to the execution unit from the reservation station during an initial processing cycle in response to a determination that the instruction is valid;

determination means for determining in a subsequent processing cycle whether the execution unit was busy during the initial processing cycle;

reissuing means for resending the instruction to the execution unit during the subsequent processing cycle; and marking means for marking the instruction as issued in response to an absence of a determination that the execution unit was busy during the first processing cycle.

18. The processing system of claim 17, wherein the reservation station includes a bit associated with each instruction stored within the reservation station, wherein the bit is utilized for recording the state of each instruction, and wherein the bit indicates whether an instruction is valid.

19. The processing system of claim 17, wherein the reservation station is connected to the execution unit by a latch circuit.

20. The processing system of claim 17, wherein the reservation station stores twelve instructions within its buffers.

* * * * *